United States Patent [19]

Carre

[11] 4,053,185
[45] Oct. 11, 1977

[54] DUAL BRAKING CORRECTION DEVICE

[75] Inventor: Jean Jacques Carre, Montreuil, France

[73] Assignee: Societe Anonyme D.B.A., Paris, France

[21] Appl. No.: 644,690

[22] Filed: July 12, 1976

[30] Foreign Application Priority Data

Jan. 17, 1975 France .................. 75.01423

[51] Int. Cl.² .................. B60T 8/18; B60T 8/26
[52] U.S. Cl. .................. 303/6 C; 188/349; 303/22 R
[58] Field of Search .................. 303/6 C, 22 R, 22 A, 303/6 R, 52, 6 A, 6 M, 23 A, 23 R, 84 R, 84 A; 188/195, 349, 152, 151 A, 345, 106 R

[56] References Cited

U.S. PATENT DOCUMENTS

| 3,442,557 | 5/1969 | Oberthur | 303/22 R |
| 3,466,099 | 9/1969 | Schultz | 303/52 |
| 3,578,821 | 5/1971 | Guettier | 303/22 R |
| 3,731,981 | 5/1973 | Bueler | 303/6 C X |
| 3,758,168 | 9/1973 | Parsons | 303/52 |
| 3,830,549 | 8/1974 | Kito et al. | 303/52 X |
| 3,891,280 | 6/1975 | Severinsson et al. | 303/22 R |
| 3,967,861 | 7/1976 | Nagara | 303/6 C |

FOREIGN PATENT DOCUMENTS

| 2,237,650 | 2/1973 | Germany | 303/6 C |
| 2,354,879 | 6/1974 | Germany | 303/22 R |

Primary Examiner—Trygve M. Blix
Assistant Examiner—Douglas C. Butler
Attorney, Agent, or Firm—Leo H. McCormick, Jr.; Ken C. Decker

[57] ABSTRACT

A braking correction device comprising two correcting valves of which the inlets are separately connectible to two independent braking pressure sources and the outlets to two independent sets of brake actuators, each valve being capable of controlling the pressures at its inlet and outlet in accordance with a predetermined relationship and comprising a piston subject to resilient return spring. The correction device comprises force distributing member situated between the resilient return spring and the pistons of the correcting valves, the distributing member comprising a block of elastomeric material enclosed in a rigid shell comprising a cylindrical cavity in whose bottom the force distributing block is fitted, the cavity comprising a cylindrical edge slidable receiving an assembly comprising two projections contacting the block and co-operating with the pistons of the valves. The braking correction device is intended for a dual vehicle hydraulic brake system.

5 Claims, 3 Drawing Figures

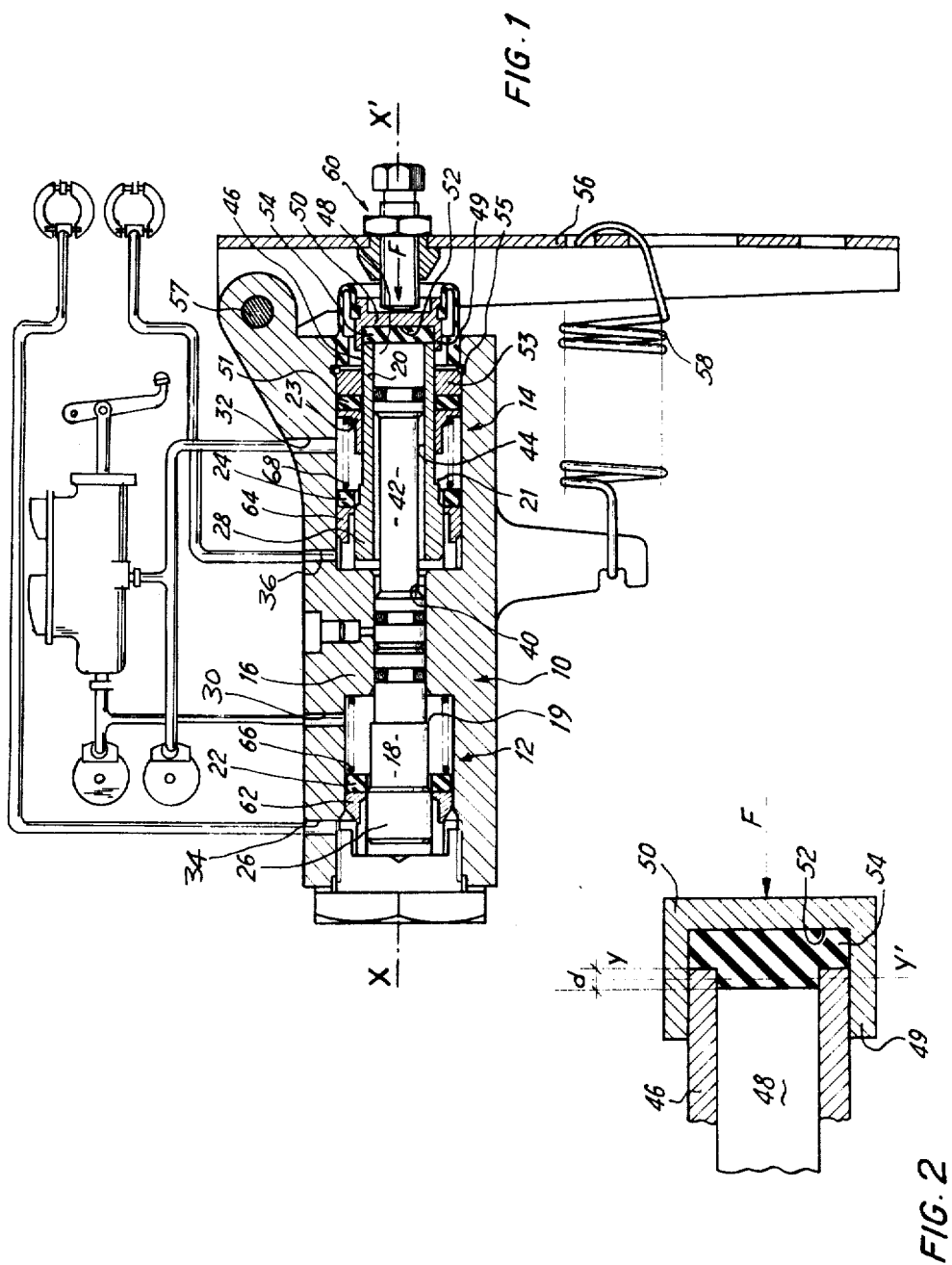

DUAL BRAKING CORRECTION DEVICE

BACKGROUND OF THE INVENTION

The invention relates to a braking correction device comprising two correcting valves and intended for a dual hydraulic brake circuit in a motor vehicle.

In a dual circuit of this type, the correcting valves generally have inlets separately connectible to two independent braking pressure sources and outlets to two independent sets of brake actuators, each valve being capable of controlling the pressures at its inlet and outlet in accordance with a predetermined relationship. The valves used are either of the pressure limiting type, in which the pressure at the outlet is limited to a predetermined value, or of the proportional pressure-compensating type, in which the pressure at the outlet increases, beyond a transition pressure, proportionately to but less than the increase in the pressure at the valve inlet. Each valve has a piston subject to resilient return means which may be associated with means for detecting the load applied to at least one axle of the vehicle. It has been customary hitherto, in the case of dual corection devices, to connect the resilient return means to the pistons of the two valves by a mechanical rod and beam system. The mechanical systems used are not always very reliable due to vibrations on the vehicle, and also it is difficlt to ensure that the return forces acting on each valve piston are accurately distributed. The operating characteristics of the two independent brake circuits associated with the respective correcting valves have therefore been appreciably different, with a consequent risk of unbalancing the vehicle's braking. This disadvantage is found particularly in dual circuits in which the valves are arranged either "crosswise" or "double-L", with each valve controlling the brake actuators associated with the rear wheel on one side of the vehicle.

SUMMARY OF THE INVENTION

I have devised an apparatus which enables the return force delivered by the resilient means to be distributed highly accurately to each of the correcting valve pistons. This apparatus includes a braking correction device with a force distributing means situated between the resilient means and the pistons of the correcting valves. The distributing means comprising a block of elastomeric material enclosed in a deformable enclosure of constant volume.

The object of this invention is to provide a dual brake system with a correcting mechanism to provide substantially equal operating pressure to each brake system for distribution to separate rear wheel brakes.

BRIEF DESCRIPTION OF THE DRAWINGS

FIG. 1 illustrates a sectional view of a correction device embodying the invention;

FIG. 2 is a enlarged sectional view of the force distributing means shown in FIG. 1.

DETAILED DESCRIPTION OF THE INVENTION

Figure 3:
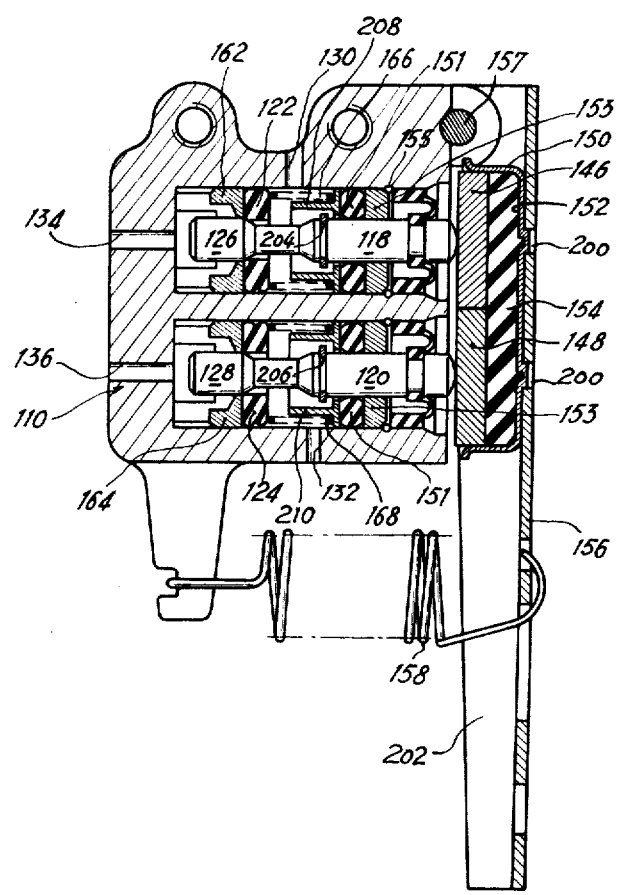
FIG. 3 is a sectional view of another correction device embodying the invention.

FIG. 1 shows the housing 10 of a dual correction device containing two cylindrical chambers 12, 14 separated by a partition 16. Each chamber contains a braking correcting valve of the proportional pressure-compensating type, consisting essentially of a differential piston 18 or 20 and a resilient rubber ring 22 or 24 of which the periphery is slidable along the surface of the cylindrical chamber. Each piston has a large-diameter cylindrical head 26 or 28 capable of co-operating in a fluid-tight manner with the rubber ring 22 or 24, of which the internal diameter is slightly less than that of the cylindrical head, a bevel being provided to facilitate engagement of the head in the ring as described below with reference to the operation of the apparatus. As a result each assembly comprising a differential piston and a ring separates the cylindrical chamber of a correcting valve into two compartments connectible respectively to an independent braking pressure source by an inlet orifice 30 or 32 and to a brake actuator set by way of an outlet orifice 34 or 36, the latter communicating with the compartment into which the large-diameter cylindrical portion of the differential piston projects. The independent pressure sources can generally be any conventional tandem master cylinder.

As FIG. 1 shows, the two pistons 18, 20 are coaxial. The wall 16 contains an aperture 40 which connects the two chambers 12, 14 and into which project both the small-diameter portion of the piston 18 and one end of a spacer 42, of which the other end projects in a fluid-tight manner into an internal bore 44 in the piston 20. To prevent pressure variations in one compartment in chamber 14 from affecting the movements of the piston 18, the effective cross-sections of both ends of the spacer 42 are equal, so that the latter is pressure-balanced. The free ends 46, 48 of the piston 20 and spacer 42 project from the housing 10 through a bearing 53, fluid-tightness between the projection 46 and the housing being ensured by a seal 51. To prevent the pistons 18, 20 from escaping from their chambers, they bear steps 19, 21 capable of bearing on the partition 16 or on an annular portion 23 held in position in the housing due to co-operation with the bearing 53, which in turn is retained by a circlip 55.

The ends 46, 48 project into a cylindrical cavity 52 in a rigid shell 50. The shell 50 contains a cylindrical cavity 52, in the bottom of which there is fitted a block 54 of elastomeric material. The block permits distribution of a return force which is transmitted by the shell 50 from a lever 56 pivoted on a pin 57 on the housing 10, and which is generated by resilient return means defined by a spring 58. In the embodiment described here by way of example, the block 54 is a pad of approximately 5 to 6 mm thick, and the material used has a Shore hardness of 60. The free end of the lever 56 can be associated with conventional load detecting means (not shown) so as to vary the tension of the spring 58 according to the variations in the loads applied to at least one axle of the vehicle. Also, the initial calibration of the correcting valves can be regulated by means of a screw and nut device 60. To conclude this description of the dual correction device, each ring 22, 24 is urged to bear on a sleeve 62, 64 by a spring 66 or 68 respectively. The sleeves perform a multiple function: They act as shoulders to position the rings 22, 24 in the chambers; and they have circumferentially spaced bearing surfaces to guide the cylindrical heads 26, 28. Notches between the adjacent bearing surfaces enable the fluid to flow along the cylindrical head. The sleeves 62, 64 co-operate with the bearing surfaces 16 and 53 in the housing to ensure correct axial positioning of the correcting valve components without appreciably increasing the dimensions of the surfaces 16, 53.

The two projections 46, 48 form an assembly slidably received by the cylindrical edge 49 of the cavity 52. Each projection has one end in contact with the block. The area of the block face adjacent to the ends of the projections is equal to the sum of the areas of the contacting end faces of projections 46, 48 associated with the two pistons. In the described embodiment of the invention the block is a pad having its faces parallel to a plane perpendicular to the sliding axis X-X' of the pistons 18, 20. In this embodiment also the bottom of the cavity 52 and the faces of the pad 54 are circular. The free edge 49 of the shell 50 is carefully extended so that it always covers the end 46, whatever the respective positions of the pistons in the housing 10, so that a deformable enclosure of constant volume is defined between the internal walls of the cylindrical cavity 52 and the corresponding projections 46, 48, as the elastomer block 54 is substantially incompressible. The longitudinal dimensions of the various components of the dual correction device are such that during operation the free-end faces of the projections 46, 48 always maintain contact with the block 54.

MODE OF OPERATION OF THE INVENTION

The correction device shown in FIG. 1 is designed for "crosswise", "double-L" or "double H" brake circuits, two correcting valves are selected which have identical operating characteristics under normal conditions. For information in "crosswise" brake circuits the front left wheel is associated with a rear right wheel whereas the front right wheel is associated with the rear left wheel; in the "double-L" brake circuits each sub-circuit controls one brake actuator on both front wheels and a brake actuator on a rear wheel; in "double-H" brake circuit each sub-circuit controls one brake actuator on the four wheels of the vehicle. To this end the differential pistons have the same effective cross-sections for both their larger and their smaller portions. The projections 46, 48 therefore have identical cross-sections, of course, so that during normal operation the return force transmitted by the lever or linkage means 56 is distributed equally between the pistons 18, 20 of the correction device. In this case the elastomer pad 54 behaves rather like incompressible fluid enclosed in a sealed compartment, and the pistons 18, 20 may be regarded as operated from the lever 56 by way of a hydrostatic transmission. Naturally, by selecting different ratios between the cross-sections of the free-end faces of 46 and 48, the total return force can be distributed as desired, without difficulty and with great accuracy.

Let us assume first that the two independent brake subcircuits are operating correctly. First we will consider the operation of the correcting valve itself. When the brake circuit is idle, the spring 58 urges the two pistons 18, 20 to abut on the left-hand end (in FIG. 1) of the chambers 12, 14. Thanks to the positioning sleeves 62, 64 which retain the rings 22, 24, the latter are clear of the cylindrical heads 26, 28 and fluid can flow freely between the inlet orifices 30, 32 and outlet orifices 34, 36. In the normal operating position, the stepped pistons 18 and 20 are urged towards the left by a force created by the combination of the spring 58 and the fluid pressure supplied to inlets 30 and 32 acting on the area of diameters 19 and 21 which is greater than the counter-acting force created by the fluid pressure acting on the area of the cylindrical heads 26 and 28 the valve is open. When the value of the pressure to inlets 30 and 32 is increased, the pistons 30 and 32 are urged to the left as shown in FIG. 1 to close fluid communication between the inlet and outlet ports. A further increase of the inlet pressure acts on the piston surface 19 and 21 to urge the piston towards the left until the outlet pressures are sufficient to close the fluid communication again. Thereafter, the inlet pressure increases as a function of the ratio of the area of the stepped pistons 18 and 20. When the driver releases his brake pedal, the cylindrical head, due to the bevel, engages the ring 22, 24 and slides towards the right in the FIG. 1, the ring being kept abutting on the sleeve by the return spring 66, 68 and by the contrary pressures acting on its two sides. The differential piston 18, 20 slides in the ring 22, 24 until the pressure at the outlet orifice exceeds the pressure at the inlet orifice, so that the ring 22, 24 is itself urged by the pressures towards the right in FIG. 1, again passing the bevel and again providing a free connection between the inlet and outlet orifices. Because the cylindrical head 26 can slide in the ring 22 when the braking pressure is released, there are none of the hysteresis phenomena which commonly arise during the operation of braking correcting valves of the proportional pressure-compensating type with differential pistons. The hysteresis is eliminated because the effective cross-sections of the faces of the differential piston are unchanged, whether the correction device is in a phase of pressure increase or a phase of pressure decrease. Clearly, by using means for detecting the load applied to at least one axle of the vehicle, the tension of the spring 58 and therefore the position of the transition point can be varied according to the changes in load, so as to give optimum braking irrespective of the static or dynamic load on the vehicle. Whatever the load conditions, the pad 54 does not undergo any appreciable change in volume. The end faces of the projections 46, 48 remain in the same plane relative to the dish 50. This plane Y-Y' is indicated diagrammatically in FIG. 2.

Let us assume that the brake sub-circuit associated with the valve in the cylindrical chamber 12 has failed. The spacer 42 and piston 18 are now urged to the left in FIG. 1 until the cylindrical head 26 abuts on the plug in the housing 10, due to the return force F transmitted by the lever 56. The force distributing pad will tend to deform into the shape shown diagrammatically in FIG. 2, so that the end faces of the projections 46, 48 bearing on the pad 54 are a distance $d$ apart. In the case of the reaction disc illustrated by way of example, that is, a pad having a Shore hardness of 60 and a thickness of about 6 mm, it is possible where $d$ remains less than about 2 mm to avoid any appreciable variation in the distribution of the force F to the projection 46. As a result the dish 50 and pad 54 associated with the two projections 46, 48 still behave like a hydrostatic transmission, and the intensity of the partial return force obtained on the projection 46 remains equal to the strength of the force F multiplied by the ratio of the effective area of the projection 46 to the ratio of the total area of the bottom of the cavity 52.

On the other hand, if the dimensions of the piston 18 and spacer 42 are such that the distance $d$ exceeds 2 mm once the piston 18 is abutting on the plug in the housing 10 and the piston 20 is being urged to the right in FIG. 1 during braking, the force transmitted to the projection 46 due to the hydraulic nature of the transmission is augmented by a force due to shearing of the elastomer pad 54. Consequently, when one of the two brake sub-circuits fails, the partial return force acting on the piston of the valve associated with the intact circuit can be increased so as to increase the value of the transition point and so to reduce the effect of this correcting valve. This feature is often desirable because it is important to be able to use the maximum pressure for all the brake actuators associated with the intact circuit of the vehicle, at least for a large part of the braking period.

Consequently, if a leak occurs at a ring 22 the hydraulic reaction force transmitted to the corresponding projection increases. There is therefore corresponding compression of the reaction pad and a reduction in the partial return force transmitted to the other projection insofar as the compression covers a sufficiently long distance, in the present case 2mm. In the event of leakage from a valve, therefore, the pressure in the brakes associated with it is greater than that normally present, but on account of the rubber pad the pressure in the brakes associated with the intact valve is lower than normal.

The dual braking correction device illustrated in FIG. 3 has two identical correcting valves of the pressure limiting type. Since the dual correction device illustrated in FIG. 3 has much in common with that shown in FIG. 1, it will not be described in detail. Components like those already described bear the same reference numeral plus 100.

The correcting valves are of the pressure limiting type, with the result that the diameter of the cylindrical head 126, 128 equals that of the free end of the piston 118, 120 respectively. Fluid under pressure from a master cylinder is communicated through inlet ports 130 and 132 to the pistons 118 and 120. This fluid under pressure flows past seals 122 and 124 to the outlet ports 134 and 136. The fluid pressure acts on the cylindrical heads 126 and 128 to overcome the moving force of spring 158 acting through the force distributing pad 154 and interrupts the free communication of fluid past seals 122 and 124. Thereafter, any increase in fluid pressure from the master cylinder is proportioned to the outlet ports 134 and 136 as a function of the ratio of the area of small diameter to the larger diameter of the pistons 118 and 120. Each valve also has a stop washer 204, 206 attached to the piston 118, 120 to co-operate with a retainer 208, 210 for the spring 166, 168 and prevent the piston from escaping from the housing.

The two valves are arranged in parallel in the housing 110 and co-operate with the lever 156 by way of a force distributing pad 154 with oblong surfaces. The rigid shell 150 is of pressed steel and is punched into two apertures 200 in the lever 156, which has a U-shaped cross-section so that its edges 202 help to retain and position the shell relative to the housing 110. The two pistons 118, 120 co-operate with the pad 154 by way of twin plates 146, 148 of identical area, so that during normal operation both correcting valves have the same cutt-off pressure. The two plates slide relative to one another and along the edge of the cylindrical cavity 152. The dimensions of the components of the correction device can be selected so that, as desired, the partial return force acting on the piston of the intact valve on failure of a brake circuit can be either constant, or increased due to the shearing strain on the force distributing pad, the latter being for a constant total return force generated by the spring 158.

What is claimed is:

1. A correction device for a vehicle braking system comprising:
    a housing in which are disposed two correcting valves having inlet and outlet ports adapted to be separately connected to two independent sets of vehicle brake actuators respectively, each of said two correcting valves including a control piston slidably mounted in a bore, each of said control pistons being adapted to control communication between its corresponding inlet and outlet ports;
    resilient means having a tension variable as a function of the load applied on the vehicle wheel axle associated with the vehicle;
    force distributing means being provided for respectively transmitting to each of said control pistons, part of the force generated by said resilient means in the direction of opening of said two correcting valves, said force distributing means having a rigid shell with a cylindrical cavity located therein;
    linkage means connected to said resilient means for transmitting an input force from the resilient means to said force distributing means;
    a block of elastomeric material located within said cavity; and
    a projection extending from each of said control pistons into said cavity and contacting said block, the area of the block face adjacent each of the projections being substantially equal to the sum of the areas of the contacting faces of said ends to hold said block within a deformable enclosure of constant volume and thereby transmit equal operational forces to said control pistons.

2. A braking correction device as claimed in claim 1, wherein the areas of the said two projections are equal.

3. A braking correction device as claimed in claim 1, wherein the two correcting valves are located in two chambers provided on a single housing, the two control pistons being arranged coaxially in said housing, one control piston being adjacent to the resilient return means and being traversed by an internal bore, said internal bore slidably receiving the projection associated with the other control piston.

4. A braking correction device as claimed in claim 3, wherein the other control piston cooperates with the block by way of a projection consisting of a push rod, one end of said push rod being slidably mounted in a fluid-tight manner in the internal bore whereas the other end of the push rod is slidably mounted in a fluid-tight manner in an aperture provided through a partition separating the two chambers, both ends of the push rod having the same effective area.

5. A braking correction device as claimed in claim 1, wherein two correcting valves are arranged in parallel relationship, said each piston of the valves acts on the block by way of twin plates defining the projections.

* * * * *